Oct. 25, 1955     A. J. NUGENT     2,721,486
TWO DIRECTIONAL DIFFERENTIAL

Filed April 2, 1954     2 Sheets-Sheet 1

INVENTOR.
ARCHIE J. NUGENT,
BY
McMorrow, Berman + Davidson
ATTORNEYS

Oct. 25, 1955  A. J. NUGENT  2,721,486
TWO DIRECTIONAL DIFFERENTIAL
Filed April 2, 1954  2 Sheets-Sheet 2

INVENTOR.
ARCHIE J. NUGENT,
BY
McMorrow, Berman & Davidson
ATTORNEYS.

United States Patent Office 2,721,486
Patented Oct. 25, 1955

2,721,486

TWO DIRECTIONAL DIFFERENTIAL

Archie J. Nugent, Forsyth, Mont.

Application April 2, 1954, Serial No. 420,547

2 Claims. (Cl. 74—700)

This invention relates to mechanisms for connecting the drive shaft to the differential of a motor vehicle.

An object of the invention is to provide a mechanism for connecting the drive shaft to the differential of a motor vehicle, by which mechanism the differential may selectively be driven in either direction.

Another object of the invention is to provide a mechanism for connecting the drive shaft to the differential of a motor vehicle which is hand actuable to reverse the direction of the drive applied to the differential, thus eliminating the necessity of a reverse gear for the vehicle.

A further object of the invention is to provide a mechanism of the character above referred to which is of simple and durable construction and which is effective in operation.

Other objects and advantages of the invention will appear from the following description considered in conjunction with the attached drawings in which.

Figure 1:
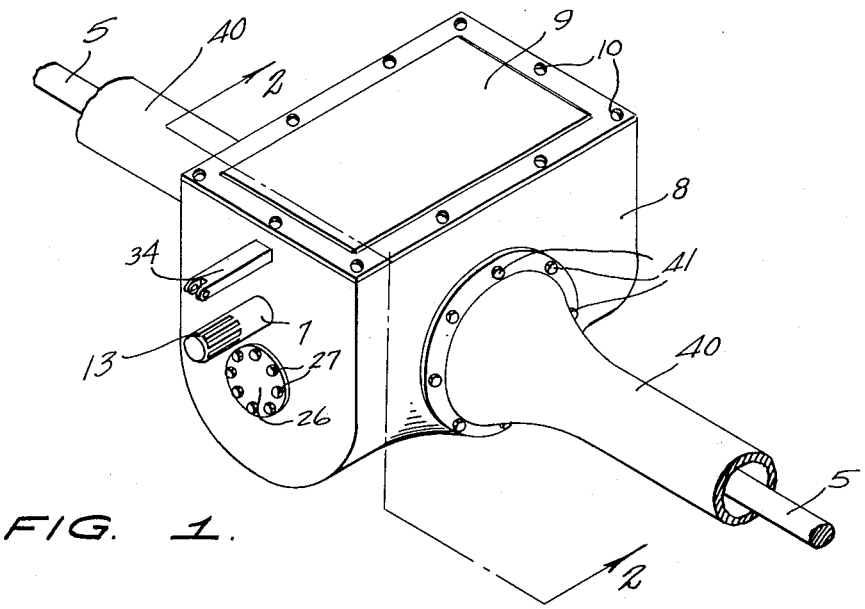
Figure 1 is a perspective view of a rear axle of a motor vehicle showing the housing enclosing the differential and the mechanism of the present invention.
Figure 2:
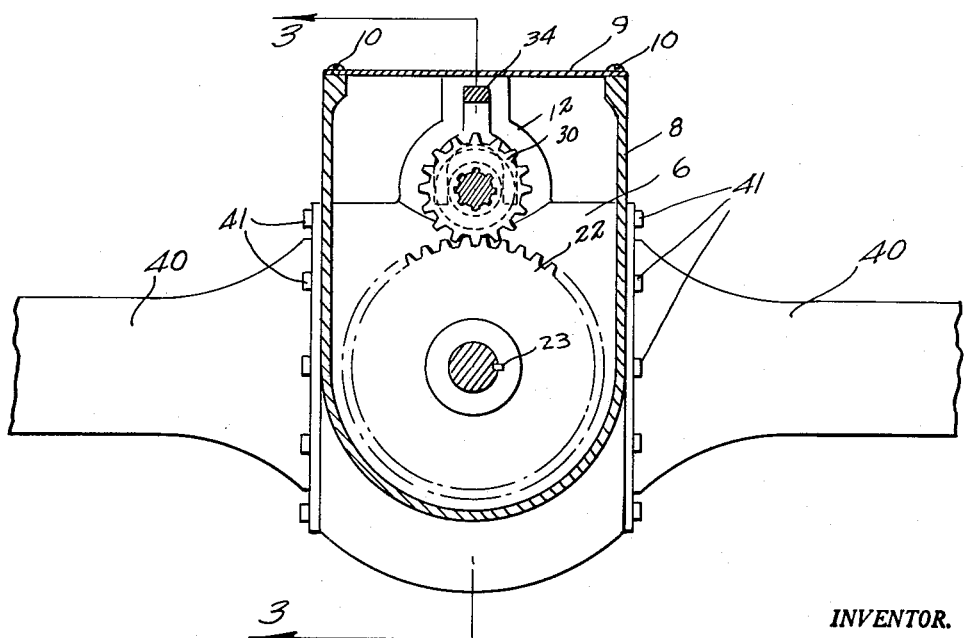
Figure 2 is a view taken along the line 2—2 of Figure 1.

Referring now to the drawings in more detail, the reference numeral 1 designates generally a differential of conventional construction, including a ring gear 2, rotatable about a horizontal axis, a differential case 3 and planetary gears 4. Axle shafts 5 extend outwardly in both directions from the differential 1 along the axis of rotation of the ring gear 2. An inner housing 6 encloses the differential 1.

An outer housing surrounds and is spaced from the inner housing 6. The outer housing consists of a unitary bottom and wall structure 8 and a removable top 9 secured to the upper edges of the structure 8 by screws 10. An axle housing 40 surrounds each axle shaft 5 and is connected to the adjacent side of the structure 8 by screws 41.

A drive shaft 7 extends perpendicularly to and spaced from the axis of rotation of the ring gear 2. The shaft 7 extends across the outer housing above the inner housing 6 and is rotatably supported in opposed walls of the outer housing upon roller bearings 11. The shaft 7 is also rotatably supported in a roller bearing 12 depending from the top of the outer housing 9 and positioned intermediate the walls of the housing. The forward end of the shaft 7 is splined, as shown at 13, for connection to the adjoining section of the drive shaft of the vehicle.

A first driven shaft 14 is on one side of the axis of the ring gear 2 and parallel to the drive shaft 7. A first bevel pinion 15 is on one end of the driven shaft 14 and is in meshing engagement with the ring gear 2. A second driven shaft 16 is on the other side of the axis of the ring gear 2 and is parallel to the drive shaft 7. A second bevel pinion 17 is on one end of the second driven shaft 16 and is in meshing engagement with the ring gear 2. The shafts 14 and 16 extend inwardly from opposed walls of the structure 8 and extend through the adjacent walls of the inner housing 6, being rotatably supported by the ball bearings 18 and 19 respectively on the walls of the structure 8 of the outer housing and by the ball bearings 20 and 21 respectively in the walls of the inner housing 6. A gear 22 is fixed upon the shaft 14, intermediate the bearings 18 and 20, by means of a key 23. A similar gear 24 is fixed upon the shaft 16, intermediate the bearings 19 and 21, by means of a key 25. A circular plate 26 secured to the outer surface of the outer casing by screws 27 covers the exposed end of the shaft 14 and the bearing 18. A similar plate 28, secured to the outer face of the outer housing by screws 29, covers the exposed ends of the shaft 16 and the bearing 19.

Figure 3:
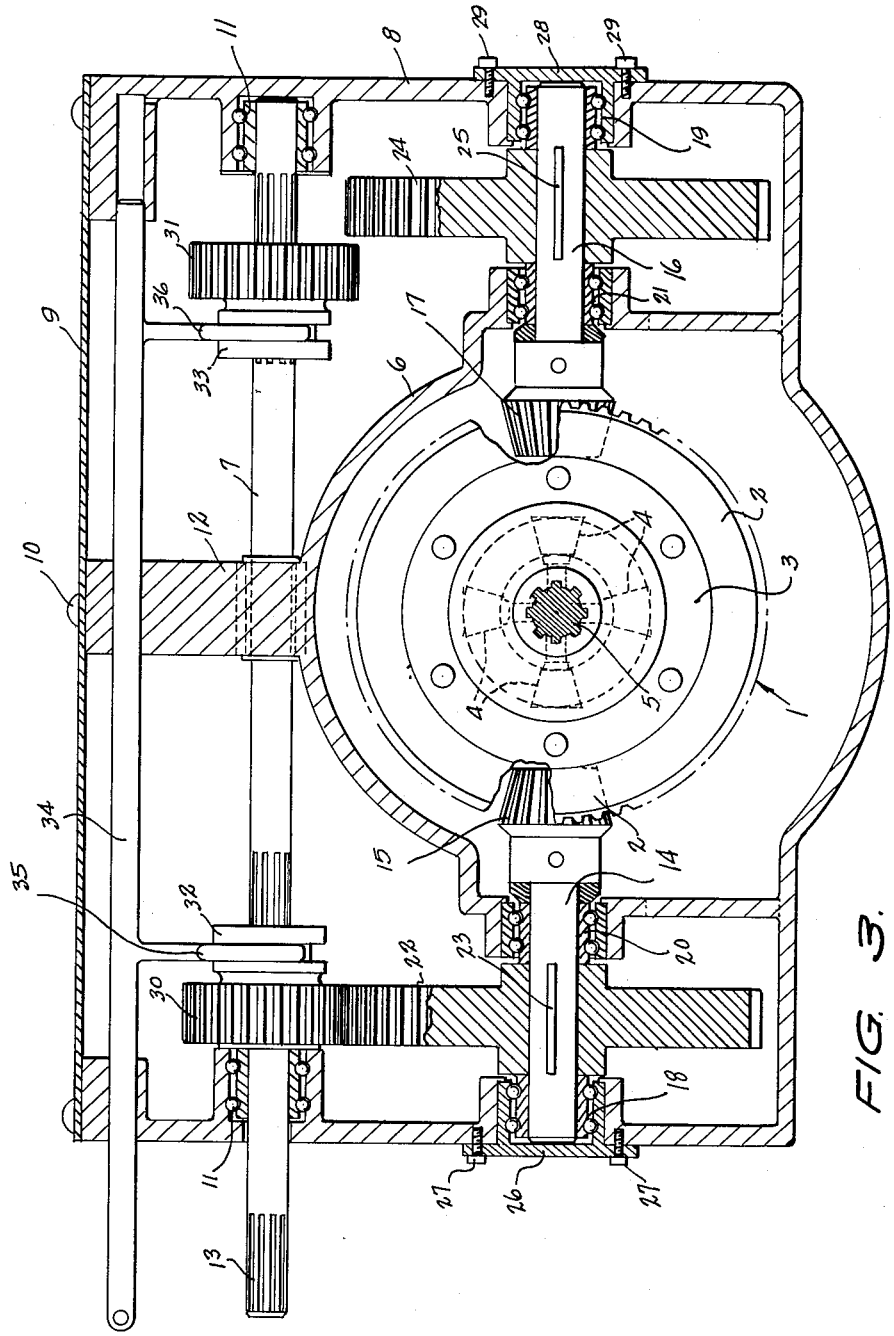
Figure 3 is a view taken along the line 3—3 of Figure 2, on an enlarged scale.

A pair of pinions 30 and 31 are slidably supported upon the drive shaft 7. The pinions 30 and 31 are splined upon the shaft 7 for limited forward and backward movement therealong. The pinions 30 and 31 are provided with circumferentially grooved drums 32 and 33 extending from the facing sides of the pinions and connected to the pinions for sliding movement therewith along the shaft 7. As shown in Figure 3, the pinion 30 is in meshing engagement with the gear 22 while the pinion 31 is out of meshing engagement with the gear 24. Hand actuable means is operatively connected to the pinions 30 and 31 for shifting them from the position shown in Figure 3 to a position in which the pinion 30 is out of meshing engagement with the gear 22 and the pinion 31 is in meshing engagement with the gear 24. The means consists of a shifting bar and a pair of shifting forks 35 and 36 depending from the bar 34. The bar 34 is slidably supported within the outer housing in parallel spaced relation with respect to the drive shaft 7 and the forks 35 and 36 engage the circumferential grooves in the drums 32 and 33, respectively. Thus, longitudinal movement of the bar 34 is effective to slide the pinions 30 and 31 correspondingly upon the shaft 7. The forward end of the bar 34 extends exteriorly of the outer housing and is provided with means for connection to an actuating lever or handle.

From the foregoing description it will be apparent that when the pinion 30 is in mesh with the gear 22, as shown in Figure 3, rotation of the drive shaft 7 will be transmitted to the ring gear 2 through the bevel pinion 15, causing rotation of the ring gear 2 and the axle shafts 5 in one direction. If now, the bar 34 is moved to shift the pinion 30 out of mesh with the gear 22 and the pinion 31 into mesh with the gear 24, rotation of the shaft 7 will be transmitted to the ring gear 2 through the bevel pinion 17, causing rotation of the ring gear 2 and the axle shafts 5 in the other direction. Thus, by the use of the device of the present invention, the drive shaft may be connected to the ring gear in either of two ways so as selectively to cause the ring gear, and through it the axle shaft, to be rotated in either direction. A vehicle equipped with the present invention need not have a reverse gear in its transmission, inasmuch as the present device will not only permit the vehicle to be reversed, but will make available all of the speeds of its transmission in the reverse direction.

What is claimed is:

1. The combination with a differential including a ring gear rotatable about a horizontal axis, of a drive shaft extending perpendicularly to and spaced from the axis of rotation of said ring gear, a first driven shaft on one side of the axis of said ring gear and parallel to said drive shaft and having one end drivingly connected to said ring gear, a second driven shaft on the other side of the axis of said ring gear and parallel to said drive shaft and having one end drivingly connected to said ring gear, a gear on each of said driven shafts, a pair of pinions each slidably supported on said drive shaft, one of said pinions on
ing
aid
her
on-
of
lta-
ge- 901
932
938
939
950